United States Patent [19]

Nakayama et al.

[11] Patent Number: 5,686,509
[45] Date of Patent: Nov. 11, 1997

[54] EPOXY RESIN STRUCTURAL ADHESIVE COMPOSITION

[75] Inventors: Akira Nakayama, Yokosuka; Toshio Nagase, Tsukuba; Tadashi Ashida, Yokohama; Masahiko Ohnishi, Hiratsuka, all of Japan

[73] Assignee: Nippon Zeon Co., Ltd., Tokyo, Japan

[21] Appl. No.: 553,410

[22] PCT Filed: May 24, 1994

[86] PCT No.: PCT/JP94/00828

§ 371 Date: Nov. 22, 1995

§ 102(e) Date: Nov. 22, 1995

[87] PCT Pub. No.: WO94/28082

PCT Pub. Date: Dec. 8, 1994

[30] Foreign Application Priority Data

May 24, 1993 [JP] Japan ................... 5-144267

[51] Int. Cl.$^6$ ................... C08F 136/06; C08F 238/10; C08L 51/00
[52] U.S. Cl. ................... 523/201; 523/407; 525/65; 525/310; 525/360; 525/530; 525/902
[58] Field of Search ................... 525/65, 310, 360, 525/530, 902; 523/201, 407

[56] References Cited

U.S. PATENT DOCUMENTS

| | | | |
|---|---|---|---|
| 4,668,736 | 5/1987 | Robins et al. | 525/65 |
| 4,778,851 | 10/1988 | Henton et al. | 525/65 |
| 5,177,122 | 1/1993 | Shih | 523/201 |

FOREIGN PATENT DOCUMENTS

| | | |
|---|---|---|
| 2-80483 | 3/1990 | Japan . |
| 2-138354 | 5/1990 | Japan . |
| 2-233747 | 9/1990 | Japan . |
| 3-255146 | 11/1991 | Japan . |
| 4-339849 | 11/1992 | Japan . |
| 5-65391 | 3/1993 | Japan . |

*Primary Examiner*—Randy Gulakowski
*Attorney, Agent, or Firm*—Birch, Stewart, Kolasch & Birch, LLP

[57] ABSTRACT

An adhesion-reinforcing composition for an epoxy resin adhesive which comprises a copolymer resin particle having been ion-crosslinked with a univalent or divalent metal cation, which particle is comprised of (i) a core ingredient composed of a polymer comprising diene monomer units and optional crosslinking monomer units and having a glass transition temperature not higher than −30° C. and (ii) a shell ingredient composed of a copolymer having a glass transition temperature of at least 70° C. and comprising acrylate or methacrylate monomer units and 0.01–20 wt. parts, per 100 wt. parts of the shell ingredient, of units of a radically polymerizable unsaturated carboxylic acid monomer having a carboxyl group and 3–8 carbon atoms; the core/shell weight ratio being 5/1–1/4. A composition comprising 100 wt. parts of an epoxy resin, 15–60 wt. parts of the adhesion-reinforcing composition, and 3–30 wt. parts of a heat-activation type curing agent is useful as a structural adhesive for automobile parts.

12 Claims, No Drawings

EPOXY RESIN STRUCTURAL ADHESIVE COMPOSITION

TECHNICAL FIELD

This invention relates to a novel adhesion-reinforcing composition for an epoxy resin adhesive, and an epoxy resin structural adhesive composition containing the novel adhesion-reinforcing composition. More particularly, it relates to an ion-crosslinked acrylic resin adhesion-reinforcing composition for imparting toughness and pseudo-curability to an epoxy resin structural adhesive composition, and also relates to an epoxy resin structural adhesive composition containing the acrylic resin adhesion-reinforcing composition, which exhibits an enhanced storage stability over a long storage period and is capable of being widely used for various adherend materials.

The epoxy resin structural adhesive composition of the present invention is valuable as a structural adhesive used for automobiles.

BACKGROUND ART

Epoxy resins have various excellent properties, and therefore, have heretofore been used widely, for example, as an adhesive, an adhesive film, a matrix resin, a casting resin, a powdery molting resin, a paint, an encapsulating agent for electronic circuits, and a base resin for various composite materials.

Nevertheless epoxy resins have a poor impact resistance, and various attempts have been made to improve the impact resistance. Namely proposals of dispersing a polyamide resin or other impact resistance improvers in an epoxy resin have been made. However, the epoxy resin having been incorporated therein the impact resistance improver has a poor pseudo-curability.

In general, it is known that, if a rubber ingredient having a glass transition temperature not higher than −30° C. as an impact resistance improver is incorporated in a plastic material, external stress is absorbed by the incorporated impact resistance improver and thus the impact resistance is greatly enhanced. However, many rubber ingredients have poor practicality for an adhesive for which a high storage stability is required, because, when the rubber ingredients are incorporated in a liquid epoxy resin matrix, the dispersibility greatly varies depending upon the mixing conditions and the resulting compositions have a poor storage stability.

Pseudo-curability also is important for an epoxy resin adhesive. To impart a good pseudo-curability as well as a good impact resistance, it is known that it is effective to incorporate in an epoxy resin a core-shell type modifier composed of an acrylate or methacrylate polymer (Japanese Unexamined Patent Publication No. H2-80483).

By the term "pseudo-curability" used herein we mean a property such that a liquid adhesive or a paste adhesive is solidified into a non-sticky or sticky state when the adhesive is heated to a temperature lower than the thermal hardening temperature. Pseudo-curability is beneficial for an adhesive. Namely, in an automobile industry, when an epoxy resin-based heat-curable adhesive composition is coated on a metal substrate and then the adhesive-coated substrate is subjected to processing such as folding, cutting, degreasing and acid-treatment, the adhesive tends to be partly scattered or separated from the metal substrate or an excessive adhesive is inevitably forced to flow out from the coated area and is difficult to completely remove therefrom. Therefore, the working environment is worsened and a pre-treating liquid used prior to painting is apt be stained with the adhesive. In contrast, if the epoxy resin-based heat-curable adhesive composition coated on a metal substrate is immediately heated in a short time to be thereby pseudo-cured, an excessive adhesive can easily be removed from the coated area on the substrate, and there is no possibility of staining of a pro-treating liquid with the adhesive.

The above-mentioned core-shell type modifier particles composed of an acrylate or methacrylate polymer resin for imparting pseudo-curability and impact resistance exhibit a high compatibility with an epoxy resin which is a matrix of an adhesive composition. Therefore, the modifier particles are apt to exhibit a remarkable viscosity increase during storage before heat-curing, and become difficult to coat the adhesive on an adherend. The storage stability of the modifier particles can be improved by crosslinking an acrylate or methacrylate resin layer for the shell, but the formation of crosslink in the shell inevitably leads to reduction in impact resistance.

Ion-crosslinked polymers are well known as an ionomer (tradename). It is intended by the ionomer that poor properties of a polymer having a planar structure, such as thermal resistance, solvent resistance and mechanical properties including creep resistance at a high temperature, are improved by the formation of an ion-crosslinked structure. In contrast to conventional polymers having a three-dimensional structure crosslinked by a covalent bond, the ion-crosslinked polymers are characterized as possessing a good processability as a thermoplastic polymer. In view of this beneficial property, the use of the ion-crosslinked polymers is increasing.

Where a heat-curable adhesive is made, it is occasionally employed that finely divided resin particles such as an impact resistance improver are suspended or dispersed in a liquid medium such as a plasticizer, in a liquid monomer or a liquid polymer, the dispersion of the resin particles is coated or shaped, and then the coating or shaped article is heated to cause a reaction whereby the coating or shaped article is cured, and the resin particles and the medium are integrated together. In view of the working properties for processing and shaping and the mechanical properties of the shaped article, it is recommended that the resin particles and the medium have approximately the same compatibility parameters. But, where the resin particles and the medium have approximately the same compatibility parameters, the resin particles dispersed in the medium are apt be swollen with the medium during storage, and thus, the viscosity of the resin particle dispersion varies and the storage stability is deteriorated, This results in deterioration of the working properties for shaping and coating.

In an assembly for automobiles using a body frame, predetermined parts are mounted on a body frame and then shell plates are mounted thereon. In general the mounting of the shell plates on the body frame is effected by spot welding, instead of line welding, wherein the non-welded areas among the welded spots are adhered by an adhesive as an expedient binding means. Alternatively, in an automobile construction by a monocoque construction system wherein a frame is not used, constriction units are bound by spot welding accompanied by application of an adhesive onto the non-welded areas among the welded spots.

The structural adhesive used for automobile assembly must exhibit a large adhesive force for metal adherends used as structural materials for automobile construction, such as a hot-rolled steel sheet, a cold-rolled steel sheet and an aluminum sheet. In other words, the structural adhesive must always exhibit a T-peel strength of at least 20 kgf/25 mm as measured at a peel angle of 180° for various metal adherends. Further, the structural adhesive must exhibit a satisfactory adhesion even for an oiled metal surface because a steel sheet is generally smeared with rust preventing oil. Conventional structural adhesives do not stably exhibit a large adhesion for various adherend materials.

DISCLOSURE OF INVENTION

In view of the foregoing, a primary object of the present invention is to provide an epoxy resin structural adhesive composition comprising finely divided particles of a core-shell type diene-acrylate or diene-methacrylate polymer resin dispersed in an uncured epoxy resin medium which has a compatibility parameter approximately similar to that of the diene-acrylate or diene-methacrylate polymer resin, which composition is characterized in that the resin particles are not apt to be swollen with the medium, and the adhesive composition exhibits a good storage stability over a long period and a high adhesion strength for various adherend materials.

The inventors gave found that the swelling of particles of a core-shell type diene acrylate or diene-methacrylate polymer resin with an uncured epoxy resin medium can be prevented or minimized by ion-crosslinking the resin particles, and an epoxy resin structural adhesive composition comprising the ion-crosslinked resin particles exhibits an improved storage stability over a long period and a high adhesion strength for various adherend materials, and the heat-cured product has high mechanical strengths. The present invention has been completed on the basis of these findings.

In one aspect of the present invention, there is provided an adhesion-reinforcing composition for an epoxy resin adhesive which comprises a copolymer resin particle having been ion-crosslinked with a univalent or divalent metal cation; said copolymer resin particle being comprised of:

(i) A core ingredient composed of a polymer comprising diene monomer units and optional crosslinking monomer units and having a glass transition temperature not higher than −30° C. and (ii) a shell ingredient composed of a copolymer having a glass transition temperature of at least 70° C. and comprising acrylate or methacrylate monomer units and 0.01 to 20 parts by weight, based on 100 parts by weight of the shell ingredient, of units of a radically polymerizable unsaturated carboxylic acid monomer having a carboxyl group and 3 to 8 carbon atoms; the ratio of the core ingredient/the shell ingredient being in the range of 5/1 to 1/4 by weight.

In another aspect of the present invention, there is provided an epoxy resin structural adhesive composition comprising (A) 15 to 60 parts by weight of the above-mentioned ion-crosslinked copolymer resin particle, (B) 100 parts by weight of an epoxy resin, and (C) 3 to 30 parts by weight of a heat-activation type curing agent for the epoxy resin.

BEST MODE FOR CARRYING OUT THE INVENTION

The adhesion-reinforcing composition for an epoxy resin adhesive of the present invention and the epoxy resin structural adhesive composition of the present invention will now be described in detail.

In the epoxy resin structural adhesive composition of the present invention, ingredient (A) is finely divided particles of a core-shell type diene-acrylate or diene-methacrylate copolymer resin, which have been ion-crosslinked with a univalent or divalent metal cation.

Ingredient (A) is prepared as follows. First, a core ingredient (i), i.e., a rubbery seed polymer comprised of a diene monomer units and optional crosslinking monomer units and having a glass transition temperature (Tg) of not higher than −30° C. is prepared. As examples of the diene monomer used for the preparation of the diene polymer having a Tg not higher than −30° C., there can be mentioned conjugated diene compounds such as butadiene, isoprene, 1,3-pentadiene, cyclopentadiene and dicyclopentadiene; and non-conjugated diene compounds such as 1,4-hexadiene and ethylidene-norbornene. These diene monomers may be used either alone or in combination. Of these, butadiene and isoprene are preferable.

If desired, a crosslinking monomer can be added into the diene monomer for the preparation of a rubbery polymer having a enhanced rubbery properties. As the crosslinking monomer, those which have at least two double bonds having substantially same reactivities are used, which include, for example, ethylene glycol diacrylate, ethylene glycol dimethacrylate, butylene glycol diacrylate, butylene glycol dimethacrylate, trimethylolpropane diacrylate, trimethylolpropane dimethacrylate, trimethylolpropane triacrylate, trimethylolpropane trimethacrylate, hexanediol diacrylate, hexanediol dimethacrylate, oligoethylene diacrylate and oligoethylene dimethacrylate. Further, aromatic divinyl monomers such as divinylbenzene, and triallyl trimellitate and triallyl isocyanurate can be used. These monomers may be used either alone or in combination provided that the resulting polymer has a glass transition temperature (Tg) of not higher than −30° C. The amount of the crosslinking monomer is usually in the range of 0.001 to 5% by weight, preferably 0.1 to 2% by weight, based on the total weight of the monomers used for the preparation of the core ingredient (i).

If desired, another copolymerizable monomer can be copolymerized with the above-mentioned diene monomer and the optional crosslinking monomer. As specific examples of such copolymerizable monomer, there can be mentioned aromatic vinyl compounds such as styrene, vinyltoluene, and α-methylstyrene; vinyl cyanide compounds such as acrylonitrile and methacrylonitrile; and vinylidene cyanide, 2-hydroxyethyl acrylate, 2-hydroxyethyl methacrylate, 3-hydroxybutyl acrylate, 2-hydroxyethyl fumarate, hydroxybutyl vinyl ether, monobutyl maleate, glycidyl methacrylate and butoxyethyl methacrylate. These copolymerizable monomers may be used alone or in combination. The amount of the copolymerizable monomer is appropriately selected within a range such that the resulting polymer has a Tg not higher than −30° C., and is usually smaller than 50% by weight based on the total weight of the monomers for the preparation of the core ingredient (i). If desired, a molecular weight modifier such as t-dodecyl metcapan can be added.

Core ingredient (i), i.e., the diene polymer particles preferably have a particle diameter of 0.1 to 0.5 μm. If the particle diameter is smaller than 0.1 μm, ingredient (A) composed of core ingredient (i) and shell ingredient (ii) has a small particle diameter and is apt to be swollen with the lapse of time in an epoxy resin structural adhesive composition, with the result of an undesirable viscosity increase of the adhesive composition. If the particle diameter is larger than 5 μm, a stable latex of spherical particles is difficult to obtain, and when shells are formed on the particles by polymerization for the formation of ingredient (ii), the resulting core-shell particles have an irregular shape and are subject to sedimentation, and the epoxy resin structural adhesive composition becomes unstable in viscosity and poor in uniformity.

Secondly, a shell ingredient (ii), i.e., a copolymer having a glass transition temperature of at least 70° C. and comprising acrylate or methacrylate monomer units and units of a radically polymerizable unsaturated carboxylic monomer having a free carboxyl group and 3 to 8 carbon atoms, is formed on each core ingredient (i) by graft-copolymerizing the acrylate or methacrylate monomer and the unsaturated carboxylic monomer onto the diene polymer particles [core ingredient (ii)], namely, by copolymerizing these monomers in the presence of the diene polymer particles. The copolymerization is carried out by an emulsion polymerization procedure.

As examples of the acrylate and methacrylate monomers, there can be mentioned alkyl methacrylates having 1 to 6 carbon atoms such as methyl methacrylate, isopropyl methacrylate, t-butyl methacrylate and cyclohexyl methacrylate. These monomers may be used either alone or in combination. Of these, methyl methacrylate is most preferable.

As specific examples of the radically polymerizable unsaturated carboxylic monomer having a carboxyl group and 3 to 8 carbon atoms, there can be mentioned unsaturated monocarboxylic acids such as acrylic acid, methacrylic acid, ethacrylic acid, crotonic acid and cinnamic acid; unsaturated dicarboxylic acids such as maleic acid, itaconic acid, fumaric acid, citraconic acid and chloromaleic acid, and anhydrides thereof; and monoesters of unsaturated dicarboxylic acids such as monomethyl maleate, monoethyl maleate, monobutyl maleate, monomethyl fumarate, monoethyl fumarate, monomethyl itaconate, monoethyl itaconate and monobutyl itaconate, and derivatives thereof. These monomers may be used either alone or in combination. Of these, acrylic acid, methacrylic acid, maleic acid, maleic anhydride and itaconic acid are preferable.

If desired, other copolymerizable monomers can be used in combination with the acrylate or methacrylate monomer and the radically polymerizable unsaturated carboxylic acid monomer. As examples of the optional copolymerizable monomers, there can be mentioned those which are recited with regard to the optional copolymerizable monomers used for the preparation of core ingredient (i). The optional copolymerizable monomers may be used either alone or in combination, and the amount thereof is usually not larger than 50% by weight based on the total weight of the monomers for the formation of shell ingredient (ii).

The copolymer resin particle [ingredient (A)] has a copolymer containing a carboxyl group at least in the shell portion thereof. The copolymer of shell ingredient (ii) preferably has at least one carboxyl group on average per molecule of the copolymer, and preferably contains 0.01 to 20 parts by weight, more preferably 0.05 to 10 parts by weight, and most preferably 0.1 to 5 parts by weight, per 100 parts by weight of the copolymer, of the unsaturated carboxylic acid monomer units having a carboxyl group. If the amount of the unsaturated carboxylic acid monomer units is smaller than 0.01 parts by weight, the surface effect of swelling prevention due to the ion-crosslinking is minimized. If the amount of the unsaturated carboxylic acid monomer units is larger than 20 parts by weight, an increase of said surface effect is observed only to a minor extent, and the mechanical properties of the base resin are rather deteriorated.

In the copolymer resin particle, it is possible that the entire shell is composed of the carboxyl group-containing copolymer. Alternatively only the outer surface portion of the shell can be composed of the carboxyl group-containing copolymer. As the process for preparing the copolymer resin particles having a shell, the outer surface portion of which is composed of the carboxyl group-containing copolymer, there can be mentioned (i) a process wherein the carboxyl group-containing unsaturated carboxylic acid monomer is continuously or intermittently added into the polymerization mixture at the last stage of the emulsion polymerization course, and (ii) a process wherein the shell is formed by emulsion-polymerizing a methacrylate or acrylate monomer, and then, the produced polymer particles are saponified with an alkali or another saponifier. The copolymer resin particles having a shell, the outer surface portion of which is composed of the carboxyl group-containing copolymer, are advantageous in that the satisfactory properties of the copolymer resin can be manifested with the minimum amount of the carboxyl group-containing unsaturated carboxylic acid monomer units.

The copolymer resin particles having a shell, the entirety of which is composed of the carboxyl group-containing copolymer, and a core which does not contain carboxyl group-containing monomer units, are prepared, for example, by a multi-stage core-shell emulsion polymerization process wherein the monomers other than a carboxyl group-containing monomer are polymerized by an emulsion polymerization procedure to afford polymer particles for forming the core, and then, monomers containing a carboxyl group-containing monomer are emulsion-polymerized in the presence of the core-forming polymer particles whereby the shell composed of the carboxyl group-containing copolymer is formed on the core-forming polymer particles.

The acrylate or methacrylate copolymer forming the shell must have a glass transition temperature of at least 70° C. If the glass transition temperature is lower than 70° C., when the copolymer resin particles are blended with an epoxy resin, the obtained structural adhesive composition has a poor storage stability, and the copolymer resin particles are apt to melt adhere under heating and, when they are spray dried, they cause clogging of a nozzle.

The latex containing the core-shell copolymer prepared by the above-mentioned multi-stage emulsion procedure is usually directly spray-dried to give a powdery core-shell type copolymer having an excellent dispersibility in an epoxy resin. As mentioned above, the powdery core-shell type copolymer can be produced by a multi-stage seed emulsion polymerization process including at least two polymerization stages. It is possible that a seed latex prepared in the first stage is partially coagulated and then the monomers are graft-polymerized onto the polymers in the coagulated latex. Further it is possible that a polymer latex prepared by the emulsion polymerization process is coagulated by a salting-out method or a freezing method, and the coagulated polymer is separated and hydrated to give a wet cake, which is then dried in a fluidized bed to yield agglomerated particles.

The weight of the shell in the thus-prepared core-shell type copolymer particle is the weight of the copolymer prepared by graft-copolymerization of the acrylate or methacrylate monomer, the carboxyl group-containing radically polymerizable unsaturated monomer, the optional crosslinking monomer and the optional other copolymerizable monomer. The weight ratio of the core ingredient/the shell ingredient is in the range of 5/1 to 1/4. If the weight ratio is outside this range, the object of the present invention is difficult to achieve.

Then the above-mentioned core-shell type copolymer resin particle is treated with a univalent or divalent metal cation to be thereby ion-crosslinked. As preferable examples of the univalent or divalent metal cation, there can be mentioned univalent ions of metal such as potassium, sodium, lithium and cesium, and divalent ions of metal such as calcium, zinc, tin, chromium and lead, especially, univalent or divalent ions of metal belonging to groups I to III of the periodic table. As specific examples of donors giving the univalent or divalent metal cations, there can be mentioned oxide and hydroxide; inorganic acid salts such as phosphate, carbonate, nitrate, sulfate, chloride, nitrite and sulfite; organic acid salts such as octate, stearate, oleate, caprate, formate, succinate, erucinate, linoleate, palmitate, propionate, acetate, adipate, butyrate, naphthenate, thiocarbonate, and acetylacetonate; and alcoholates such as ethoxide and methoxide. As salts of an acid, salts of an acid having a dissociation constant pKa of at least 4 is preferable. Of these cation donors, hydroxide and carboxylate of a univalent metal are most preferable because of enhanced reaction efficiency and high mechanical strength of the thermally cured article.

The univalent or divalent cation donors are advantageous over cation donors of trivalence or more valence in that heating for the ion-crosslinking can be effected within a relatively short period of time, more specifically, in a solution at room temperature within several minutes.

Where the carboxyl group-containing monomer is copolymerized in an aqueous polymerization system, the greater part of carboxyl groups are collected on the surface of copolymer particles due to their hydrophilic property. Therefore, when a cation donor is added into the aqueous phase, a reaction occurs between ions, and thus, the probability of contact of cations dissociated in the aqueous phase with the carboxyl groups having a high degree of dissociation is very high and the ion-crosslinking reaction is completed within a short period of time.

Since the ion-crosslinking reaction occurs on the outer surface of the shell ingredient of the copolymer resin particle, it is not necessary that the core ingredient is composed of a carboxyl group-containing copolymer, but may be composed of a carboxyl group-containing copolymer.

The rate of ion-crosslinking reaction of the copolymer resin particle varies depending upon the temperature only to a minor extent. Thus the amount of metal cations introduced into the copolymer resin particle by the ion-crosslinking reaction is approximately constant over a temperature range of 0 to 50° C. Therefore, a constant degree of ionic crosslinking can be obtained without a special temperature control of the reaction system.

Since a part or the entirety of the carboxyl groups in the ion-crosslinked copolymer are ionized to carboxyl anions, which form an ionic bond with a univalent or divalent metal ion as a counter cation, the degree of ion-crosslinking can easily be varied by changing the amount of the cation donor added. In general the ion-crosslinking reaction proceeds quantitatively, but the cation donor may be used in excess over the theoretical amount. The ionic crosslinking of the copolymer can easily analyzed by measuring the absorption of carboxylate groups by infrared spectrophotometry, measuring the amount of metal cations or measuring the degree of swelling with a solvent. The dissociation characteristics of the ionic crosslinking and the density thereof can be confirmed by the differential thermal analysis and the measurement of the degree of swelling, respectively.

The ion-crosslinked copolymer resin particle can effectively be obtained by appropriately selecting the mole ratio of the metal atom in the cation donor used to the carboxyl group in the copolymer. A preferable ratio of the metal atom/carboxyl group varies depending upon the desired degree of crosslinking, and is usually in the range of 0.1 to 3 by mole because the copolymer ion-crosslinked at a mole ratio falling within this range exhibits high strength. If the metal atom/carboxyl group ratio is smaller than 0.1 by mole, the surface modifying effect is deteriorated and the storage stability is not improved. If the metal atom/carboxyl group ratio is larger than 3 by mole, the resulting copolymer resin exhibits undesirably large hygroscopicity and reduced mechanical strength. The ion-crosslinked copolymer resin particle does not exhibit a reduced pseudo-curability.

As examples of the method for producing the ion-crosslinked copolymer resin particle, there can be mentioned (i) a method wherein a cation donor or a solution thereof is incorporated in a solution of an uncrosslinked copolymer in a solvent to cause an ion-crosslinking reaction, (ii) a method wherein a cation donor or a solution thereof is incorporated in a copolymer latex as-obtained by polymerization, and (iii) a method wherein a cation donor is incorporated in a mixture of an epoxy resin and an uncrosslinked copolymer during the course of preparing a structural adhesive composition. Any of these methods can be employed, but the method (ii) of incorporating a cation donor or a solution thereof is incorporated to the as-obtained polymer latex is most preferable in view of the workability and the efficiency of dispersion.

The thus-produced ingredient (A), i.e., the ion-crosslinked copolymer resin particle, is characterized in that, in contrast to a crosslinked structure by a covalent bond such as a sulfur-crosslinked structure or a peroxide-crosslinked structure, the ion-crosslinked structure thermally reversibly changes. Namely, the surface portion of the ion-crosslinked copolymer resin particle exhibits properties of a crosslinked structure at room temperature, but exhibits properties of a structure wherein the cross-links are dissociated under heat-curing conditions. This behavior leads to the characteristics that the structural adhesive composition of the present invention exhibits good storage stability and the cured product has good mechanical strength.

More specifically, ion-crosslinks are formed between a cation as a crosslinker and the carboxyl groups present as side chains on a copolymer constituting the shell of the copolymer resin particle, namely, a three-dimensional structure is formed in the shell of the copolymer resin particle. By this three-dimensional structure, swelling of the copolymer resin particle with an epoxy resin medium can be minimized, and thus, the thermally cured product exhibits good mechanical strength inherently possessed by the base polymer, and the structural adhesive composition exhibits good storage stability.

If desired, the ion-crosslinked structure can be formed in the core of the copolymer resin particle, as well as in the shell thereof as mentioned above, depending upon the intended properties of the cured product.

The core-shell type copolymer resin particle, i.e., ingredient (A), used in the structural adhesive composition of the present invention can be made, for example, by emulsion polymerization, finely divided suspension polymerization or suspension polymerization. To surface modify a polymer resin particle having a particle diameter of about 0.1 to 5 μm, finely divided polymer particles are obtained by emulsion polymerization or finely divided suspension polymerization, and then coagulated, and the monomers including the carboxyl group-containing monomer are graft-copolymerized onto the coagulated polymer particles to give a copolymer having a shell with carboxyl groups, followed by ion-crosslinking the carboxyl groups in the shell. The carboxyl group-containing monomer can be charged in a polymerization reactor (i) simultaneously with the monomers for the base polymer, (ii) at the second half stage of polymerization of the monomers for the base resin, or (iii) in lots during the polymerization of the monomers for the base resin. A preferable procedure should be chosen depending upon the combination of monomers and the particular reaction ratios of the respective monomers.

In the epoxy resin structural adhesive composition of the present invention, the amount of ingredient (A) (copolymer resin particle) is in the range of 15 to 60 parts by weight, preferably 36 to 45 parts by weight, per 100 parts by weight of ingredient (B) (epoxy resin). If the amount of ingredient (A) is smaller than 15 parts by weight, good adhesion strength is not manifested. If the amount of ingredient (A) is larger than 60 parts by weight, the structural adhesive composition has undesirably large viscosity and becomes difficult to handle.

As the epoxy resin, i.e., ingredient (B) used in the structural adhesive composition of the present invention, a liquid epoxy resin having a viscosity of 2,000 to 100,000 cps at room temperature is used. A preferable epoxy resin is derived from bisphenol A or bisphenol F. Typical examples of the epoxy resin are represented by the following formulae (1) and (2):

ylphenol. These compounds may be used either alone or in combination. Of these, dicyandiamide is most preferable.

The amount of the heat-activation type curing agent is not particularly limited, but is usually in the range of 3 to 30 parts by weight, preferably 5 to 20 parts by weight, per 100 parts by weight of the epoxy resin. With the amount smaller than 3 parts by weight, the curing is insufficient and the adhesion strength is very poor. With the amount exceeding 30 parts by weight, the composition is subject to partial degradation or deterioration due to drastic exothermic heat generating on shaping, with the results of drastic reduction in adhesive strength and discoloration.

To enhance the adhesion strength, an aliphatic and/or aromatic phosphoric acid triester having a molecular weight of 180 to 460 is preferably incorporated in the structural adhesive composition of the present invention. As specific examples of the phosphoric acid triester, there can be mentioned tricresyl phosphate, tri-2-ethylhexyl phosphate, tributyl phosphate, triphenyl phosphate, trixylyl phosphate, cresyldiphenyl phosphate, tributoxyethyl phosphate, triethyl phosphate, diphenyl-2-methacryloyloxyethyl phosphate, octyldiphenyl phosphate, dioctyl-2-methacryloyloxyethyl phosphate, trisdichloropropyl phosphate and trisdichloroethyl phosphate. Of these, tricresyl phosphate is most preferable.

The phosphoric acid ester may be used either alone or in combination. The amount of the phosphoric acid ester is usually in the range of 1 to 30 parts by weight, preferably 5 to 20 parts by weight, per 100 parts by weight of the epoxy resin (ingredient (B)).

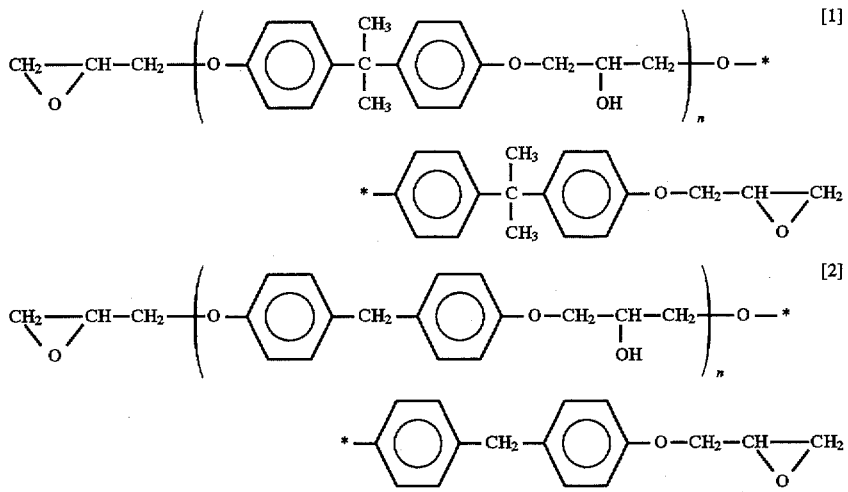

In formulae (1) and (2), n is a number larger than 0, and is preferably smaller than 1 on average because the epoxy resin is liquid at room temperature. A specific preferable example is an epoxy resin derived from a compound obtained by adding 2 to 20 moles of ethylene oxide or propylene oxide to bisphenol A.

As specific examples of ingredient (C), i.e., the heat-activation type curing agent for the epoxy resin, in the structural adhesive composition of the present invention, there can be mentioned dicyandiamide, 4,4'-diaminodiphenylsulfone, imidazole derivatives such as 2-n-heptadecylimidazole, isophthalic acid dihydrazide, N,N-dialkylurea derivatives, N,N-dialkylthiourea derivatives, acid anhydrides such as tetrahydrophthalic anhydride, isophoronediamine, m-phenylenediamine, N-aminoethylpiperazine, melamine, guanamine, trifluoroboron complex compounds and trisdimethylaminometh- The epoxy resin structural adhesive composition of the present invention can be prepared by mixing together and uniformly ingredient (B) (epoxy resin), ingredient (A) (ion-crosslinked copolymer resin particle), ingredient (C) (heat-activation type curing agent, and an optional phosphoric acid ester and other optional additives.

As the additives to be incorporated in the structural adhesive composition according to the need, there can be mentioned a plasticizer, a diluent, a stabilizer, an emulsifier, a filler, a reinforcer, a colorant, a foaming agent, an antioxidant, an ultraviolet absorber and a lubricant.

The invention will now be specifically described by reference to the following examples that by no means limit the scope of the invention.

The properties of structural adhesive compositions were evaluated by the following methods.

(1) T-peel strength
T-peel strength was measured according to JIS K-6850 using a test specimen having a size of 0.8×25×20 cm.

(2) Viscosity storage stability
A sample adhesive composition was allowed to stand at 40° C. for 7 days and the viscosity was measured by using a Brookfield H-type viscometer. The viscosity storage stability was evaluated by a viscosity ratio value obtained by dividing the viscosity as measured after the 7 day's standing by the initial viscosity, and expressed by the following three ratings.

A: viscosity ratio value is smaller than 1.5
B: viscosity ratio value is from 1.5 to 5.0
C: viscosity ratio value is larger than 5.0

(3) Pseudo-curability
A sample adhesive composition was heated at 110° C. for 5 minutes whereby the sample composition was allowed to gel, and the separability of the produced gel was evaluated. Pseudo-curability was expressed by the following three ratings.

A: the gel could easily be separated.
B: the gel had a poor strength and was broken when separated.
C: Pseudo-curing could not be observed when heated at 110° C. for 5 minutes.

EXAMPLES 1 TO 9 AND COMPARATIVE EXAMPLES

A polymerization reactor was charged with core-forming monomers and t-dodecyl mercaptan in amounts shown in Tables 1-1 to 1-3, column of "reinforcing resin particle, core ingredient", 150 parts by weight of water, 1.0 part of sodium alkylsulfate having 12 to 18 carbon atoms and 0.1 part by weight of potassium persulfate. The monomer charge was subjected to an emulsion polymerization at 70° C. When the conversion exceeded 98%, the polymerization mixture was cooled to stop the polymerization. Then, methyl methacrylate (n-butyl methacrylate was used in Comparative Example 7 instead of methyl methacrylate) in an amount shown in Tables 1-1 to 1-3, column of "reinforcing resin particle, shell ingredient[IP]" was added into the content of the reactor, and polymerization was conducted again at 70° C. When the conversion of the methyl methacrylate or n-butyl methacrylate reached 50%, unsaturated carboxylic acids shown in Tables 1-1 to 1-3, column of "reinforcing resin particle, shell ingredient" were continuously added into the reactor over a period of 3 hours (an unsaturated carboxylic acid was not added in Comparative Examples 1 and 2) to continue polymerization. When the total conversion reached 96% or more, the polymerization mixture was cooled to complete the polymerization.

To each of the thus-obtained latexes of core-shell type copolymer particles except for copolymer particles obtained in Comparative Example 5, an aqueous 1% solution of a metal cation shown in Tables 1-1 to 1-3, column of "reinforcing resin particle, cation" was added at room temperature and the mixture was stirred for 30 minutes. The cation-treated copolymer particles were spray-dried at an inlet temperature of 150° C. and an outlet temperature of 55° C.

The thus-obtained cation-crosslinked copolymer resin particles, a liquid epoxy resin, tricresyl phosphate and dicyandiamide (plus a filler in Examples 7 and 8) were mixed together according to the recipe shown in Tables 1-1 to 1-3 by using a planetary mixer at room temperature to obtain a structural adhesive composition.

The properties of the structural adhesive composition were evaluated, and the results are shown in Tables 1-1 to

TABLE 1-1

| Example No. | | Ex. 1 | Ex. 2 | Ex. 3 | Ex. 4 | Ex. 5 | Ex. 6 |
|---|---|---|---|---|---|---|---|
| Reinforcing resin particle | | | | | | | |
| Core ingredient | Butadiene | 39 | — | 39 | 39 | 39 | 39 |
| | Isoprene | — | 39 | — | — | — | — |
| | Ethyl acrylate | — | — | — | — | — | — |
| | Divinyl benzene | 0.7 | 0.7 | 0.7 | 0.7 | 0.7 | 0.7 |
| | t-Dodecyl mercaptan | 0.3 | 0.3 | 0.3 | 0.3 | 0.3 | 0.3 |
| Shell ingredient | Methyl methacrylate | 58 | 58 | 59 | 58 | 58 | 58 |
| | n-Butyl methacrylate | — | — | — | — | — | — |
| | Methacrylic acid | 2 | 2 | — | 2 | 2 | 2 |
| | Itaconic acid | — | — | 1 | — | — | — |
| Cation donor | Potassium hydroxide | 1.0 | 1.0 | 1.0 | — | 1.0 | 1.0 |
| | Zinc acetate | — | — | — | 1.0 | — | — |
| Epoxy resin | | | | | | | |
| Bisphenol A type | | 200 | 200 | 200 | 200 | 120 | 120 |
| Bisphenol F type | | — | — | — | — | 80 | — |
| Ethylene oxide-added bisphenol A type *1 | | — | — | — | — | — | 80 |
| Additives | | | | | | | |
| Plasticizer: | Tricresyl phosphate | 20 | 20 | 20 | 20 | 20 | 20 |
| Curing agent: | Dicyandiamide | 16 | 16 | 16 | 16 | 16 | 16 |
| Filler: | Calcium carbonate *2 | — | — | — | — | — | — |
| | Silica *3 | — | — | — | — | — | — |
| Average primary particle diameter (μm) | | 0.1 | 0.1 | 0.1 | 0.1 | 0.1 | 0.1 |
| Viscosity: | Initial viscosity (poise) | 570 | 568 | 670 | 620 | 410 | 440 |
| | Viscosity storage stability | A | A | A | A | B | B |
| Physical properties | | | | | | | |
| T-peel strength (kgf/25 mm) | | 22.5 | 22.0 | 22.6 | 21.0 | 24.0 | 24.2 |

TABLE 1-1-continued

| Example No. | Ex. 1 | Ex. 2 | Ex. 3 | Ex. 4 | Ex. 5 | Ex. 6 |
|---|---|---|---|---|---|---|
| Shear strength (kgf/cm$^2$) | 310 | 305 | 310 | 310 | 250 | 280 |
| Pseudo-curability | A | A | A | A | A | A |

TABLE 1-2

| Example No. | | Ex. 7 | Ex. 8 | Ex. 9 | Co.Ex.1 | Co.Ex.2 | Co.Ex.3 |
|---|---|---|---|---|---|---|---|
| Reinforcing resin particle | | | | | | | |
| Core ingredient | Butadiene | 39 | 39 | 59 | 39 | — | 75 |
| | Isoprene | — | — | — | — | 39 | — |
| | Ethyl acrylate | — | — | — | — | — | — |
| | Divinyl benzene | 0.7 | 0.7 | 0.7 | 0.7 | 0.7 | 0.7 |
| | t-Dodecyl mercaptan | 0.3 | 0.3 | 0.3 | 0.3 | 0.3 | 0.3 |
| Shell ingredient | Methyl methacrylate | 58 | 58 | 38.5 | 60 | 60 | 23.5 |
| | n-Butyl methacrylate | — | — | — | — | — | — |
| | Methacrylic acid | 2 | 2 | 1.5 | — | — | 0.5 |
| | Itaconic acid | — | — | — | — | — | — |
| Cation donor | Potassium hydroxide | 1.0 | 1.0 | 0.8 | 1.0 | 1.0 | 0.5 |
| | Zinc acetate | — | — | — | — | — | — |
| Epoxy resin | | | | | | | |
| Bisphenol A type | | 200 | 200 | 200 | 200 | 200 | 200 |
| Bisphenol F type | | — | — | — | — | — | — |
| Ethylene oxide-added bisphenol A type *1 | | — | — | — | — | — | — |
| Additives | | | | | | | |
| Plasticizer: | Tricresyl phosphate | 20 | 20 | 20 | 20 | 20 | 20 |
| Curing agent: | Dicyandiamide | 16 | 16 | 16 | 16 | 16 | 16 |
| Filler: | Calcium carbonate *2 | 50 | — | — | — | — | — |
| | Silica *3 | — | 50 | — | — | — | — |
| Average primary particle diameter (μm) | | 0.1 | 0.1 | 0.1 | 0.1 | 0.1 | 0.1 |
| Viscosity: | Initial viscosity (poise) | 630 | 1220 | 920 | 980 | 960 | 1620 |
| | Viscosity storage stability | A | A | B | C | C | Gelled |
| Physical properties | | | | | | | |
| T-peel strength (kgf/25 mm) | | 22.5 | 21.0 | 23.0 | 23.5 | 23.0 | 15.0 |
| Shear strength (kgf/cm$^2$) | | 310 | 310 | 290 | 290 | 290 | 205 |
| Pseudo-curability | | A | A | A | A | A | C |

TABLE 1-3

| Example No. | | Co.Ex.4 | Co.Ex.5 | Co.Ex.6 | Co.Ex.7 | Co.Ex.8 |
|---|---|---|---|---|---|---|
| Reinforcing resin particle | | | | | | |
| Core ingredient | Butadiene | 15 | 39 | 39 | 39 | — |
| | Isoprene | — | — | — | — | — |
| | Ethyl acrylate | — | — | — | — | 39 |
| | Divinyl benzene | 0.7 | 0.7 | 0.7 | 0.7 | 0.7 |
| | t-Dodecyl mercaptan | 0.3 | 0.3 | 0.3 | 0.3 | 0.3 |
| Shell ingredient | Methyl methacrylate | 82 | 58 | 58 | — | 58 |
| | n-Butyl methacrylate | — | — | — | 58 | — |
| | Methacrylic acid | 2 | 2 | 2 | 2 | 2 |
| | Itaconic acid | — | — | — | — | — |
| Cation donor | Potassium hydroxide | 1.0 | — | 1.0 | 1.0 | 1.0 |
| | Zinc acetate | — | — | — | — | — |
| Epoxy resin | | | | | | |
| Bisphenol A type | | 200 | 200 | 200 | 200 | 200 |
| Bisphenol F type | | — | — | — | — | — |
| Ethylene oxide-added bisphenol A type *1 | | — | — | — | — | — |

TABLE 1-3-continued

| Example No. | | Co.Ex.4 | Co.Ex.5 | Co.Ex.6 | Co.Ex.7 | Co.Ex.8 |
|---|---|---|---|---|---|---|
| Additive | | | | | | |
| Plasticizer: | Tricresyl phosphate | 20 | 20 | — | 20 | 20 |
| Curing agent: | Dicyandiamide | 16 | 16 | 16 | 16 | 16 |
| Filler: | Calcium carbonate *2 | — | — | — | — | — |
| | Silica *3 | — | — | — | — | — |
| Average primary particle diameter (μM) | | 0.1 | 0.1 | 0.1 | 0.1 | 0.1 |
| Viscosity: | Initial viscosity (poise) | 490 | 580 | 902 | 13200 | 420 |
| | Viscosity storage stability | A | A | B | *4 | C |
| Physical properties | | | | | | |
| T-peel strength (kgf/25 mm) | | 5.5 | 23.0 | 12.0 | 3.2 | 15.0 |
| Shear strength (kgf/cm$^2$) | | 250 | 320 | 260 | 110 | 320 |
| Pseudo-curability | | A | A | A | C | A |

Note:

*1 An epoxy resin obtained by reacting ethylene oxide-added bisphenol A with epichlorohydrin at a molar ratio of 2:1. The ethylene oxide-added bisphenol A was prepared by adding 3 moles of ethylene oxide to each of the terminal hydroxyl groups of bisphenol A.

*2 Finely divided calcium carbonate particles having a particle diameter of 0.1 μm.

*3 Finely divided silica particles having a particle diameter of 0.1 μm.

*4 Solidified in a gel form. Obviously the viscosity storage stability was very poor, and the viscosity was not measured after the 7 day's standing.

Industrial Applicability

An epoxy resin structural adhesive composition having incorporated therein an adhesion-reinforcing composition of the present invention exhibits good storage stability over a long period and high adhesion strength to various adherend materials. Therefore the structural adhesive composition is especially valuable as a structural adhesive for automobiles, and is useful for adhesion of various adherend materials including, for example, cold rolled steel, hot rolled steel, cold rolled stainless steel and aluminum plate.

We claim:

1. An adhesion-reinforcing composition for an epoxy resin adhesive which comprises a copolymer resin particle having been ion-crosslinked with a univalent or divalent metal cation; said copolymer resin particle being comprised of:
   (i) a core ingredient composed of a polymer comprising diene monomer units and optional crosslinking monomer units and having a glass transition temperature not higher than −30° C. and
   (ii) a shell ingredient composed of a copolymer having a glass transition temperature of at least 70° C. and comprising acrylate or methacrylate monomer units and 0.01 to 20 parts by weight, based on 100 parts by weight of the shell ingredient, of units of a radically polymerizable unsaturated carboxylic acid monomer having a carboxyl group and 3 to 8 carbon atoms; the ratio of the core ingredient/the shell ingredient being in the range of 5/1 to 1/4 by weight.

2. An adhesion-reinforcing composition for an epoxy resin adhesive according to claim 1, wherein the diene monomer is a conjugated diene monomer selected from the group consisting of butadiene, isoprene, 1,3-pentadiene, cyclopentadiene and dicyclopentadiene, or a non-conjugated diene monomer selected from the group consisting of 1,4-hexadiene and ethylidenenorbornene.

3. An adhesion-reinforcing composition for an epoxy resin adhesive according to claim 1, wherein the acrylate monomer is an alkyl acrylate having 1 to 4 carbon atoms in the alkyl group, and the methacrylate monomer is an alkyl methacrylate having 1 to 4 carbon atoms in the alkyl group.

4. An adhesion-reinforcing composition for an epoxy resin adhesive according to claim 1, wherein the radically polymerizable unsaturated carboxylic acid monomer having a carboxyl group and 3 to 8 carbon atoms is selected from the group consisting of unsaturated monocarboxylic acids, unsaturated dicarboxylic acids, unsaturated dicarboxylic anhydrides, and monoesters of unsaturated dicarboxylic acids.

5. An adhesion-reinforcing composition for an epoxy resin adhesive according to claim 1, wherein the core ingredient has a particle diameter of 0.1 to 5 m.

6. An epoxy resin structural adhesive composition comprising:
   (A) 15 to 60 parts of a copolymer resin particle having been ion-crosslinked with a univalent or divalent metal cation; said copolymer resin particle being comprised of:
      (i) a core ingredient composed of a polymer comprising diene monomer units and optional crosslinking monomer units and having a glass transition temperature not higher than −30° C. and
      (ii) a shell ingredient composed of a copolymer having, a glass transition temperature of at least 70° C. and comprising acrylate or methacrylate monomer units and units of a radically polymerizable unsaturated carboxylic acid monomer having a carboxyl group and 3 to 8 carbon atoms; the ratio of the core ingredient/the shell ingredient being in the range of 5/1 to 1/4 by weight;
   (B) 100 parts by weight of an epoxy resin; and
   (C) 3 to 30 parts by weight of a heat-activation type curing agent for the epoxy resin.

7. An epoxy resin structural adhesive composition according to claim 6, wherein the diene monomer is a conjugated diene monomer selected from the group consisting of butadiene, isoprene, 1,3-pentadiene, cyclopentadiene and dicyclopentadiene, or a non-conjugated diene monomer selected from the group consisting of 1,4-hexadiene and ethylidenenorbornene.

8. An epoxy resin structural adhesive composition according to claim 6, wherein the acrylate monomer is an alkyl acrylate having 1 to 4 carbon atoms in the alkyl group, and the methacrylate monomer is an alkyl methacrylate having 1 to 4 carbon atoms in the alkyl group.

9. An epoxy resin structural adhesive composition according to claim 6, wherein the radically polymerizable unsaturated carboxylic acid monomer having a carboxyl group and 3 to 8 carbon atoms is selected from the group consisting of unsaturated monocarboxylic acids, unsaturated dicarboxylic acids, unsaturated dicarboxylic anhydrides and monoesters of unsaturated dicarboxylic acids.

10. An epoxy resin structural adhesive composition according to claim 6, wherein the epoxy resin is selected from the group consisting of epoxides of bisphenol A, bisphenol F, and any combination thereof.

11. An epoxy resin structural adhesive composition according to claim 6, wherein the heat-activation type curing agent for the epoxy resin is dicyandiamide.

12. An epoxy resin structural adhesive composition according to claim 6, wherein the structural adhesive composition further comprises (D) 1 to 30 parts by weight of a phosphoric acid triester which is selected from the group consisting of aliphatic phosphoric acid triesters and aromatic phosphoric acid triesters, and which has a molecular weight of 180 to 460.

* * * * *